United States Patent
Meslioui

(10) Patent No.: US 12,415,611 B2
(45) Date of Patent: Sep. 16, 2025

(54) TURBO-COMPOUNDED ENGINE WITH EXHAUST DUCT ACOUSTIC ARRANGEMENT

(71) Applicant: Pratt & Whitney Canada Corp., Longueuil (CA)

(72) Inventor: Sid-Ali Meslioui, Brossard (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/341,211

(22) Filed: Jun. 26, 2023

(65) Prior Publication Data

US 2024/0425192 A1 Dec. 26, 2024

(51) Int. Cl.
| | |
|---|---|
| B64D 33/00 | (2006.01) |
| B64D 27/04 | (2006.01) |
| B64D 33/04 | (2006.01) |
| F01N 1/24 | (2006.01) |
| F02K 1/82 | (2006.01) |
| B64D 27/02 | (2006.01) |
| F02C 7/24 | (2006.01) |

(52) U.S. Cl.
CPC ............ B64D 33/06 (2013.01); B64D 27/04 (2013.01); F01N 1/24 (2013.01); F02K 1/82 (2013.01); F02K 1/827 (2013.01); *B64D 27/026* (2024.01); *B64D 33/04* (2013.01); *F02C 7/24* (2013.01); *F05D 2260/963* (2013.01)

(58) Field of Classification Search
CPC ........ B64D 33/06; B64D 27/04; B64D 27/06; F01N 1/24; F02K 1/82; F02K 1/827; F01D 25/30; F02C 7/24
See application file for complete search history.

(56) References Cited

U.S. PATENT DOCUMENTS

| | | | |
|---|---|---|---|
| 2,958,388 A | 11/1960 | Paulsen | |
| 3,177,972 A | 4/1965 | Wirt | |
| 4,244,441 A | 1/1981 | Tolman | |
| 4,263,982 A * | 4/1981 | Feuling | ................... F01N 1/085 |
| | | | 181/256 |

(Continued)

OTHER PUBLICATIONS

European Search Report for EP Application No. 24184811.8 dated Nov. 25, 2024.

*Primary Examiner* — Gerald L Sung
*Assistant Examiner* — Rene D Ford
(74) *Attorney, Agent, or Firm* — Carlson, Gaskey & Olds, P.C.

(57) ABSTRACT

A turbo-compounded engine includes a piston engine connected to drive a propulsor. An outlet of the piston engine is operable to connect products of combustion from the piston engine to pass over a turbine. The turbine is connected to drive a turbine shaft also connected to drive the propulsor. An outlet of the turbine is connected into an exhaust duct configured to exhaust the products of combustion. The exhaust duct is provided with an exhaust duct outer wall defining an exhaust chamber. A further cooling air outer wall is positioned outwardly of the exhaust duct. Flow dividers are received within an exhaust chamber inward of the exhaust duct outer wall. The exhaust duct outer wall has an inner surface and the flow dividers have an outer surface. Acoustic treatment is provided on both the inner surface of the exhaust duct outer wall and the outer surface of the flow dividers.

9 Claims, 5 Drawing Sheets

(56) References Cited

U.S. PATENT DOCUMENTS

| | | | |
|---|---|---|---|
| 5,936,210 A * | 8/1999 | Borneby | F01N 1/10 |
| | | | 181/256 |
| 7,717,229 B2 | 5/2010 | Putnam | |
| 9,856,789 B2 | 1/2018 | Bolduc et al. | |
| 11,535,392 B2 | 12/2022 | LaTulipe et al. | |
| 2002/0166718 A1* | 11/2002 | Gadefatt | F02K 1/827 |
| | | | 181/225 |
| 2018/0045110 A1 | 2/2018 | Thomassin et al. | |
| 2020/0307812 A1 | 10/2020 | Dubreuil et al. | |
| 2020/0307818 A1* | 10/2020 | Dubreuil | B64D 41/00 |

* cited by examiner

TURBO-COMPOUNDED ENGINE WITH EXHAUST DUCT ACOUSTIC ARRANGEMENT

BACKGROUND

This application relates to providing acoustic arrangements to reduce exhaust noise in a turbo-compounded engine.

Engines for aircraft applications typically include a propulsor. In some engines a fan is used and in others a propeller.

One type of engine that is showing some promise is a turbo-compounded engine. In a turbo-compounded engine there is typically a piston engine driving the propulsor. Exhaust products downstream of the piston engine pass across a turbine. The rotation of the turbine drives a shaft that also provides propulsion to the propulsor.

Such engines are provided with relatively long exhaust ducts to handle the noise that will be created. Further, the exhaust duct shape needs to fit particular installation challenges for a turboprop.

Another engine type is an auxiliary power unit ("APU"). These engines do not have a propulsor, but may use turbo-compounded engines. Such APU engines also have noise challenges.

In one type of turbo-compounded engine an electric motor also supplements the piston engine. The exhaust noise challenges in such engines are particularly acute.

SUMMARY

A turbo-compounded engine includes a piston engine connected to drive a propulsor. An outlet of the piston engine is operable to connect products of combustion from the piston engine to pass over a turbine. The turbine is connected to drive a turbine shaft also connected to drive the propulsor. An outlet of the turbine is connected into an exhaust duct configured to exhaust the products of combustion. The exhaust duct is provided with an exhaust duct outer wall defining an exhaust chamber. A further cooling air outer wall is positioned outwardly of the exhaust duct. Flow dividers are received within an exhaust chamber inward of the exhaust duct outer wall. The exhaust duct outer wall has an inner surface and the flow dividers have an outer surface. Acoustic treatment is provided on both the inner surface of the exhaust duct outer wall and the outer surface of the flow dividers.

These and other features will be best understood from the following drawings and specification, the following is a brief description.

DETAILED DESCRIPTION

Figure 1:
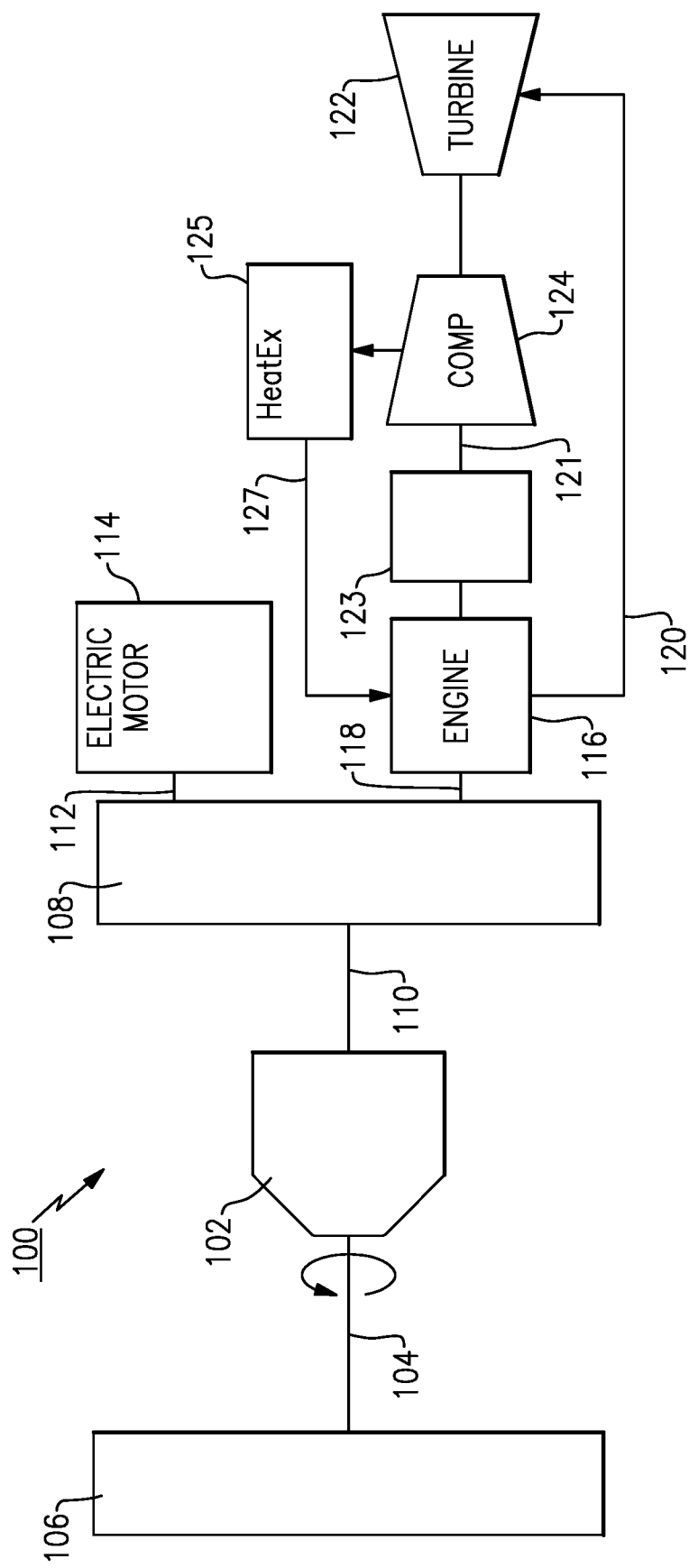
FIG. 1 schematically shows a turbo-compounded engine.

A turbo-compounded engine 100 is illustrated in FIG. 1. Engine 100 is for use on an aircraft. A gear reduction 102 is shown schematically driving a shaft 104 to in turn drive a propulsor 106. Propulsor 106 rotates at a slower speed than shaft 100 due to gear reduction 102. In embodiments the propulsor 106 could be a propeller. However, it is also within the scope of this disclosure that the propulsor could be a fan. A compound gearbox 108 takes in several sources of drive to in turn drive a shaft 110 that drives the gear reduction 102.

An electric motor 114 optionally drives a shaft 112 to provide rotational force into the compound gearbox 108.

A piston engine 116 drives a shaft 118 to also provide a source of rotation into the gearbox 108. It is known that the electric motor can provide additional power in combination with the piston engine 116 under certain operational conditions such as high power conditions. As an example, at takeoff both the electric motor 114 and the piston engine 116 may be utilized. At lower power conditions, such as cruise, perhaps only the electric motor 114 is used.

A compound gearbox 123 receives rotation from a shaft 121. An exhaust 120 from the piston engine 116 passes across a turbine 122. The turbine 122 drives the shaft 121 through the gearbox 123 to provide additional rotational force to shaft 118. The turbine 122 is also shown driving a compressor 124. The compressed air from compressor 124 passes through a heat exchanger 125 and then to the piston engine 116 through line 127.

Figure 2:
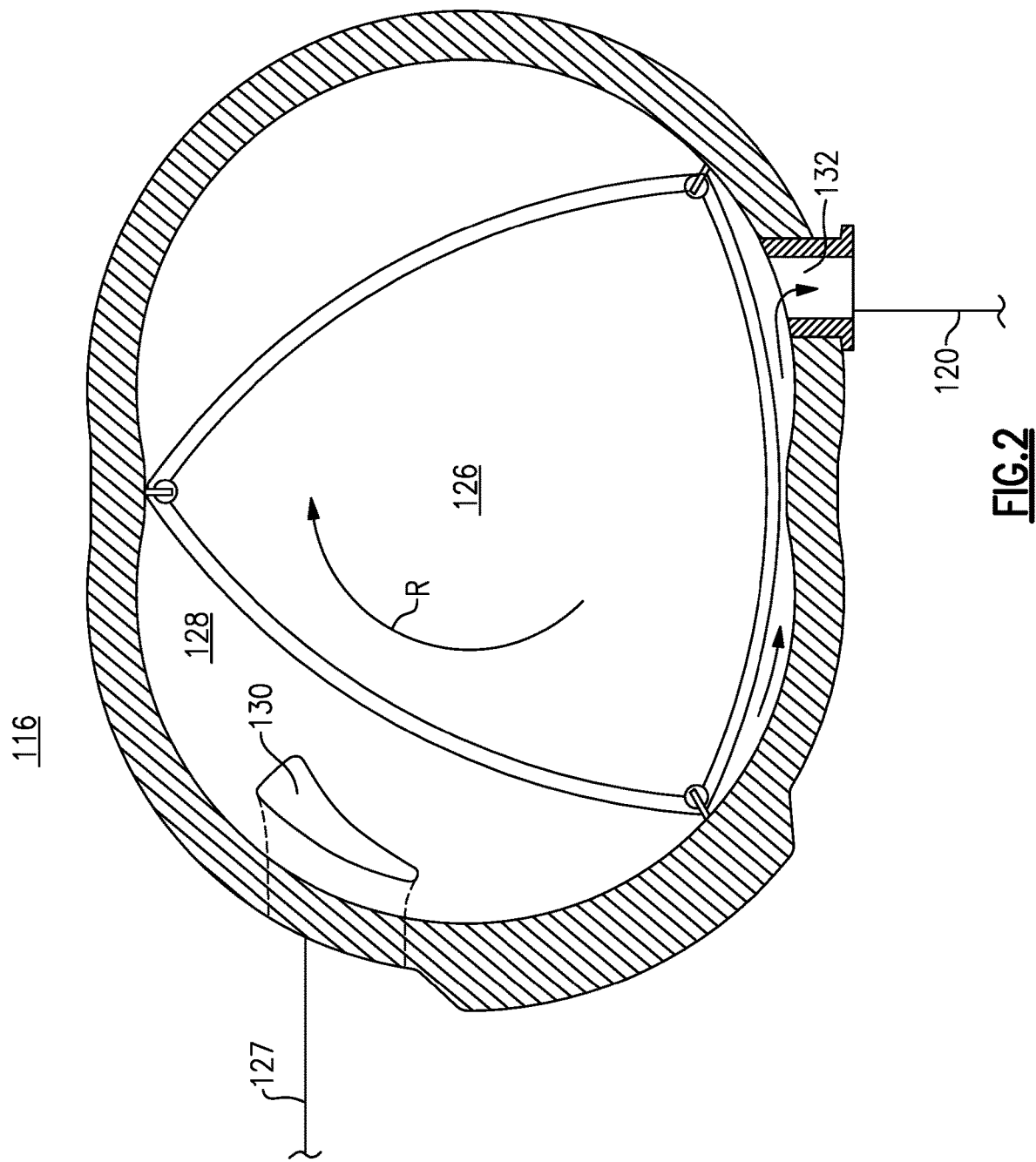
FIG. 2 shows a piston engine incorporated into the turbo-compounded engine of FIG. 1.

FIG. 2 shows an example of the piston engine 116. A rotary piston engine, such as a Wankel engine is illustrated. A piston 126 rotates within a chamber 128. Compressed air at 130 is injected into the chamber 128 from line 127. It is mixed with fuel and ignited and drives the piston 126. The products of combustion pass through outlet 132 and into line 120.

The operation of the engines 100 and 116 may be as known.

It is also known that a turbo-compounded engine could have a piston engine with a plurality of engines such as engine 116 as shown in FIG. 2. Further, it is known that the piston engine could be a reciprocating piston.

As mentioned above, there are challenges with exhaust noise in such engines, because of the pulsation nature of the rotary core.

Figure 3A:
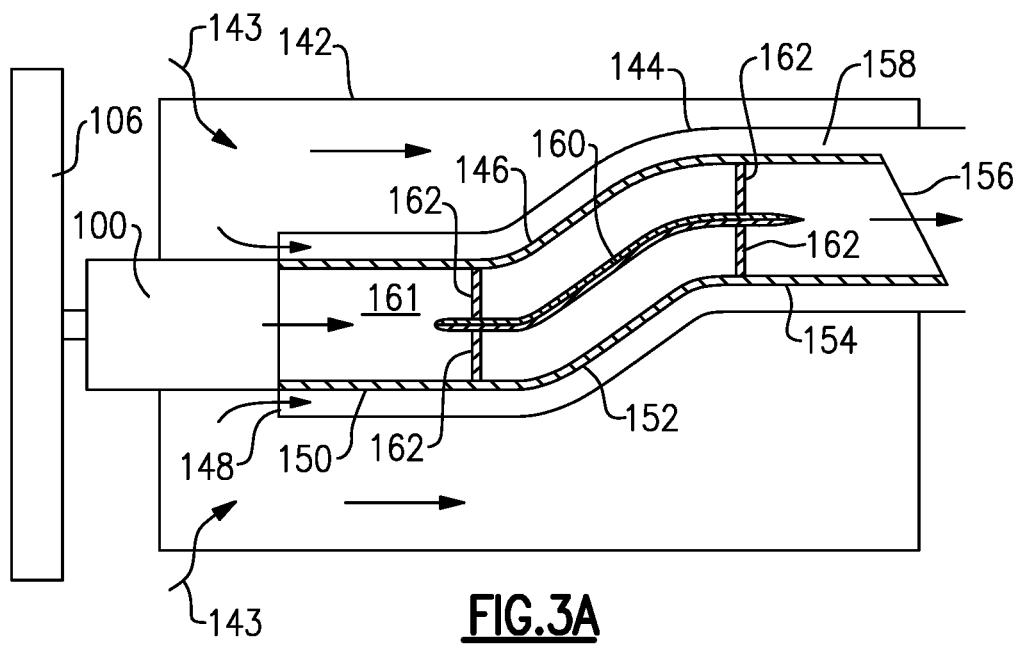
FIG. 3A shows an exhaust duct arrangement for a turbo-compounded engine.

FIG. 3A shows an exhaust for an engine such as engine 100. A nacelle 142 surrounds a core housing 144. The propulsor 106 provides propulsion for an associated aircraft. Propulsor 106 also delivers air into the nacelle 142 as shown at 143. Some of the air passes outwardly of an inner housing 144 to cool the inner housing 144.

While a propulsor is shown, the teachings of this disclosure extends to turbo-compounded engines in non-propulsor applications, such as APUs.

Another portion of the air is pumped into an inlet 148 defined between the housing 144 and an outer exhaust housing 146. That air passes downstream and through an ejector opening 158.

The products of combustion leaving the engine 100 enter a chamber 161 inward of housing 146 and provide a jet pump at an exit 156 of the housing 146.

The housing 146 may be thought of as an S-duct arrangement. There is a radially inner first generally axially extending portion 150 leading into a radially outwardly extending portion 152, which then merges into a second generally axially extending portion 154.

The first generally axially extending portion 150 extends axially away from the engine 100 with a component in an axial direction defined by the rotational axis X of the engine. The axial component is greater than a radial component of its direction.

The first generally axially extending portion 150 merges into radially extending portion 152. The radially extending portion 152 merges into the second generally axially extending portion 154.

Portion 154 extends along a direction with a component in an axial direction that is greater than a radial component.

The radially extending portion 152 extends with an axial component but also having a radial component that is greater than the radial component in both the first and second axially extending portion 150/154.

In an engine such as engine 100, the S-duct must be made relatively long to provide sufficient area for exhaust noise mitigation and reduce exhaust noise. This is particularly true when an electric motor 114 is utilized in the engine 100.

Applicant has recognized that breaking the exhaust gas flow in chamber 161 in subportions will help reduce the noise leaving the exhaust duct exit 156.

Thus, a flow divider is provided by a center bullet 160 and struts 162.

Figure 3B:
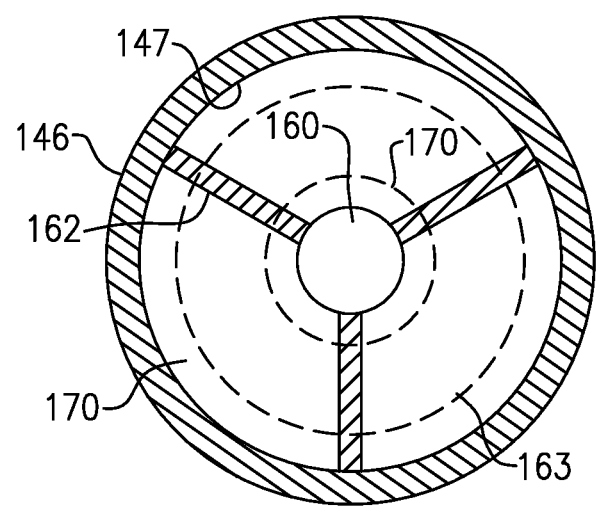
FIG. 3B is a cross-section of the FIG. 3A embodiment.

As shown in FIG. 3B, there are three chambers 163 defined between circumferentially spaced ones of the struts 162. The struts 162 may have an aero shape to minimize losses. The struts 162 and center bullet 160 thus provide flow dividers. Acoustic treatments 170 are shown on an inner surface 147 of outer wall 146 and an outer surface of the center bullet 160. The thickness of treatments 170 is exaggerated for illustration purposes only. In practice they will likely be thinner.

Figure 4A:
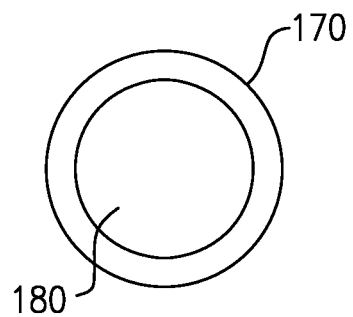
FIG. 4A shows a first acoustic treatment.

FIG. 4A shows a first embodiment of the acoustic treatment on the bullet 160. The acoustic treatment 170 may be a coating of foam or other porous materials such as fiberglass or mesh. Mesh treatments include porous materials bagged in a mesh cloth and finished with a perforated sheet to form the skin facing the flow. This avoids contamination/deterioration with hot gases in the exhaust. Similar treatments can be provided on inner surface 147.

Figure 4B:
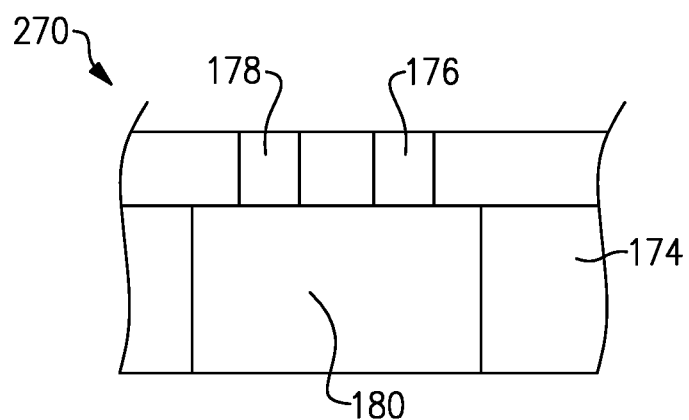
FIG. 4B shows a second example acoustic treatment.

Alternatively, FIG. 4B shows an acoustic treatment 270 which includes a plurality of chambers 180 in a flow divider body 174, and having a face plate 176 with small perforations 178 over the chamber 180.

Figure 4C:
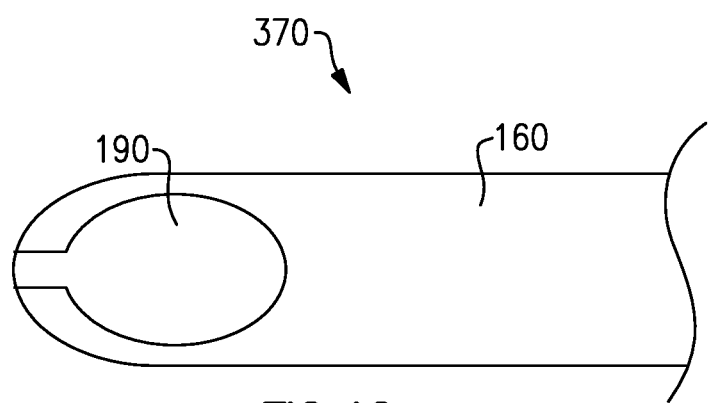
FIG. 4C shows yet another alternative acoustic treatment.

An acoustic treatment 370 as shown in FIG. 4C is shown schematically as a Helmholtz resonator 190 in the center bullet 160.

The treatments provided on the inner surface 147 may be any of these acoustic treatments, or any other acoustic treatments.

Possible wall treatments include passive types, such as fibrous, foam, ceramic, and filled cavity with a special handling of the treatment in a package.

Further, quarter-wavelength resonator type, Helmholtz resonators, single and double degree of freedom liners, made up of a perforated skin on honeycomb or partitions, volume tune liner types made up with fined tuned limited volumes on a top of which a perforated skin is bonded, where the perforations have a tuned size and number may all be used.

Figure 5A:
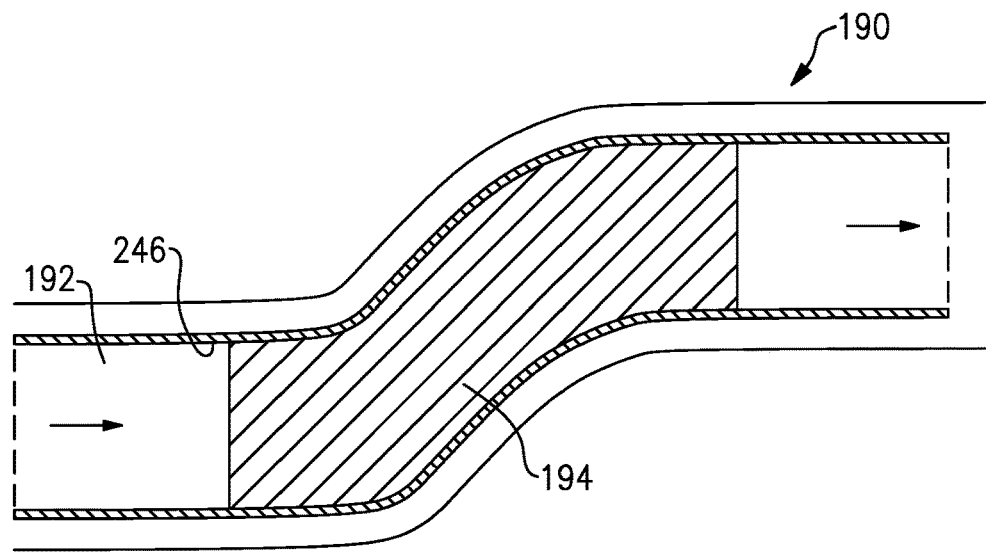
FIG. 5A shows a distinct embodiment exhaust duct.

FIG. 5A shows another exhaust duct embodiment 190 having an outer housing 246 with flow dividers 194.

Figure 5B:
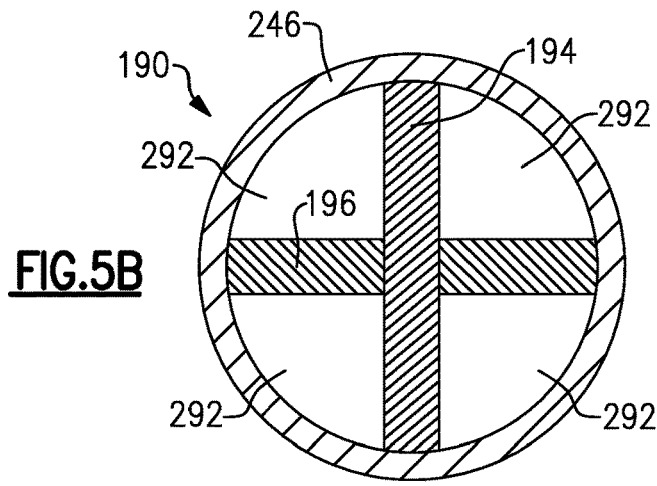
FIG. 5B is a cross-section through FIG. 5A.

As shown in FIG. 5B, there are crossing flow dividers 194 and 196 which are generally perpendicular to each other to define four separate chambers 292. The flow dividers 194/196 and the inner wall 246 will each be provided with acoustic treatment as in the above embodiment.

Figure 6:
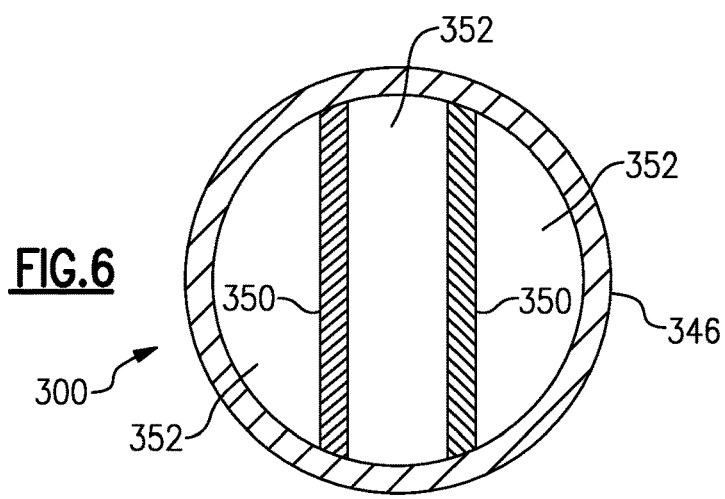
FIG. 6 shows yet another exhaust duct embodiment.

FIG. 6 shows yet another embodiment 300 wherein there are plural flow dividers 350 which are generally parallel to each other and divide an interior of the outer exhaust wall 346 into three separate chambers 352. Here again, acoustic treatments will be provided both on the outer surface of the flow dividers 350 and an inner surface of the outer wall 346 will provide effective noise reduction in the turbo-compounded engine.

The distance or the length of acoustically treated walls is a function of the level of attenuation needed. The total length is optimized along with the number of splitters and type of acoustic treatment.

A turbo-compounded engine 100 under this disclosure could be said to include a piston engine 116 connected to drive a propulsor 106. An outlet 120 of the piston engine is operable to connect products of combustion from the piston engine 116 to pass over a turbine 122. The turbine 122 is connected to drive a turbine shaft 121 also connected to drive the propulsor 106. An outlet of the turbine is connected into an exhaust duct 146 configured to exhaust the products of combustion. The exhaust duct 146 is provided with an exhaust duct outer wall 146 defining an exhaust chamber 161. A further cooling air outer wall 144 is positioned outwardly of the exhaust duct wall 146. Flow dividers are received within an exhaust chamber inward of the exhaust duct outer wall. The exhaust duct outer wall has an inner surface and the flow dividers have an outer surface. Acoustic treatments are provided on both the inner surface of the exhaust duct outer wall and the outer surface of the flow dividers.

Although an embodiment has been disclosed, a worker of ordinary skill in this art would recognize that modifications would come within the scope of this disclosure. Thus, the following claims should be studied to determine the true scope and content of this disclosure.

What is claimed is:

1. A turbo-compounded engine comprising:
a piston engine connected to drive a propulsor, an outlet of the piston engine being operable to connect products of combustion from the piston engine to pass over a turbine, the turbine being connected to drive a turbine shaft also connected to drive the propulsor;
an outlet of the turbine connected into an exhaust duct configured to exhaust the products of combustion, the exhaust duct being provided with an exhaust duct outer wall defining an exhaust chamber, and a further cooling air outer wall positioned outwardly of the exhaust duct;
flow dividers received within the exhaust chamber inward of the exhaust duct outer wall, the exhaust duct outer wall having an inner surface and the flow dividers having an outer surface, and acoustic treatment being provided on both the inner surface of the exhaust duct outer wall and the outer surface of the flow dividers;
wherein the piston engine is a rotary engine;
wherein an electric motor is also provided to selectively drive the propulsor; and
wherein the exhaust duct outer wall has a first generally axially extending portion extending axially away from the engine with a component in an axial direction defined by the rotational axis of the engine, and the axial component being greater than a radial component, the first axial portion merging into a radially extending portion, and the radially extending portion merging into a second generally axially extending portion extending along a direction with a component in an axial direction that is greater than a radial component and the radially extending portion extending with an axial component but also having a radial component that is greater than the radial component in both the first and second generally axially extending portion.

2. A turbo-compounded engine comprising:
a piston engine connected to drive a propulsor, an outlet of the piston engine being operable to connect products of combustion from the piston engine to pass over a turbine, the turbine being connected to drive a turbine shaft also connected to drive the propulsor;
an outlet of the turbine connected into an exhaust duct configured to exhaust the products of combustion, the exhaust duct being provided with an exhaust duct outer wall defining an exhaust chamber, and a further cooling air outer wall positioned outwardly of the exhaust duct;
flow dividers received within the exhaust chamber inward of the exhaust duct outer wall, the exhaust duct outer wall having an inner surface and the flow dividers having an outer surface, and acoustic treatment being provided on both the inner surface of the exhaust duct outer wall and the outer surface of the flow dividers; and
wherein the exhaust duct outer wall has a first generally axially extending portion extending axially away from the engine with a component in an axial direction defined by the rotational axis of the engine, and the axial component being greater than a radial component, the first axial portion merging into a radially extending portion, and the radially extending portion merging into a second generally axially extending portion extending along a direction with a component in an axial direction that is greater than a radial component and the radially extending portion extending with an axial component but also having a radial component that is greater than the radial component in both the first and second generally axially extending portion.

3. The engine as set forth in claim 2, wherein an electric motor is also provided to selectively drive the propulsor.

4. The engine as set forth in claim 3, wherein a gear reduction is provided between an output shaft driven by the piston engine and the propulsor such that the propulsor rotates at a slower speed than the output shaft.

5. The engine as set forth in claim 4, wherein a compound gearbox takes in rotation from the electric motor, the piston engine and the turbine and drives the output shaft leading into the gear reduction.

6. A turbo-compounded engine comprising:
a piston engine connected to drive a propulsor, an outlet of the piston engine being operable to connect products of combustion from the piston engine to pass over a turbine, the turbine being connected to drive a turbine shaft also connected to drive the propulsor;
an outlet of the turbine connected into an exhaust duct configured to exhaust the products of combustion, the exhaust duct being provided with an exhaust duct outer wall defining an exhaust chamber, and a further cooling air outer wall positioned outwardly of the exhaust duct;
flow dividers received within the exhaust chamber inward of the exhaust duct outer wall, the exhaust duct outer wall having an inner surface and the flow dividers having an outer surface, and acoustic treatment being provided on both the inner surface of the exhaust duct outer wall and the outer surface of the flow dividers;
the piston engine is a rotary engine;
wherein the exhaust duct outer wall has a first generally axially extending portion extending axially away from the engine with a component in an axial direction defined by the rotational axis of the engine, and the axial component being greater than a radial component, the first axial portion merging into a radially extending portion, and the radially extending portion merging into a second generally axially extending portion extending along a direction with a component in an axial direction that is greater than a radial component and the radially extending portion extending with an axial component but also having a radial component that is greater than the radial component in both the first and second generally axially extending portion;
wherein an electric motor is also provided to selectively drive the propulsor; and
wherein the flow dividers divide the exhaust chamber into at least three sub-chambers.

7. The engine as set forth in claim 6, wherein the flow dividers include a central bullet and struts extending from the central bullet to the inner surface of the exhaust duct outer wall.

8. The engine as set forth in claim 6, wherein the flow dividers are a plurality of plates extending to be perpendicular to each other to define the sub-chambers.

9. The engine as set forth in claim 6, wherein the flow dividers are plural crossing plates which extend parallel to each other.

\* \* \* \* \*